US008136046B2

(12) United States Patent
Broker et al.

(10) Patent No.: US 8,136,046 B2
(45) Date of Patent: Mar. 13, 2012

(54) INFORMATION DISPLAY SYSTEM FOR AN APPLIANCE INCORPORATING ELECTRONIC INTERFACE SCREEN

(75) Inventors: John F. Broker, Colfax, IA (US);
Douglas W. Gardner, Newton, IA (US);
Alan V. Neubauer, Newton, IA (US);
Brian L. Ness, Newton, IA (US); Kim L. Wright, Newton, IA (US)

(73) Assignee: Whirlpool Corporation, Benton Harbor, MI (US)

( * ) Notice: Subject to any disclaimer, the term of this patent is extended or adjusted under 35 U.S.C. 154(b) by 2507 days.

(21) Appl. No.: 09/919,794

(22) Filed: Aug. 2, 2001

(65) Prior Publication Data
US 2003/0025733 A1 Feb. 6, 2003

(51) Int. Cl.
*G06F 3/00* (2006.01)
*G05B 15/00* (2006.01)
*D06F 33/00* (2006.01)

(52) U.S. Cl. ........ 715/765; 715/825; 715/853; 715/810; 700/83; 68/12.02

(58) Field of Classification Search .................. 345/700, 345/705, 764, 866, 828, 829, 853–855, 841, 345/783, 1.1, 3.1; 68/12.01, 12.02, 12.27; 700/19, 15, 17, 26, 27, 83, 90; 318/466; 715/700–736, 810–839, 762, 765, 841, 802, 715/805, 853–855
See application file for complete search history.

(56) References Cited

U.S. PATENT DOCUMENTS

| 5,010,551 | A | * | 4/1991 | Goldsmith et al. ............. 714/46 |
| 5,124,908 | A | * | 6/1992 | Broadbent ....................... 700/83 |
| 5,307,086 | A | | 4/1994 | Griffin et al. .................. 345/808 |
| 5,390,005 | A | * | 2/1995 | Kimoto et al. .................. 399/81 |
| 5,585,704 | A | * | 12/1996 | Elzind ........................... 318/446 |
| 5,594,472 | A | * | 1/1997 | Date .............................. 345/506 |
| 5,638,523 | A | | 6/1997 | Mullet et al. .................. 345/855 |
| 5,694,793 | A | * | 12/1997 | Nishimura et al. ........... 68/12.27 |
| 5,799,281 | A | * | 8/1998 | Login et al. ....................... 705/1 |
| 5,818,428 | A | * | 10/1998 | Eisenbrandt et al. ......... 345/173 |
| 5,874,965 | A | | 2/1999 | Takai et al. .................... 345/667 |
| 5,969,706 | A | | 10/1999 | Tanimoto et al. ............. 345/671 |
| 5,973,662 | A | | 10/1999 | Singers et al. ................. 345/418 |
| 6,177,937 | B1 | | 1/2001 | Stockham et al. ............ 345/807 |
| 6,502,265 | B2 | * | 1/2003 | Blair et al. ......................... 8/159 |
| 2002/0054156 | A1 | * | 5/2002 | Koizumi et al. .............. 345/835 |
| 2002/0128729 | A1 | * | 9/2002 | Blair et al. ....................... 700/19 |

\* cited by examiner

*Primary Examiner* — Tadeese Hailu
(74) *Attorney, Agent, or Firm* — Clifton G. Green; Diederiks & Whitelaw PLC

(57) ABSTRACT

A display system for an appliance incorporates an electronic interface screen, such as an LCD touch screen, through which a wide range of information concerning operational, diagnostic and other data concerning the appliance can be displayed. The screen is divided into a number of panels for displaying different sets of information. Selecting one of the panels results in the panel becoming enlarged so as to fill the entire LCD screen while, at the same time, displaying an additional layer of detailed information.

20 Claims, 3 Drawing Sheets

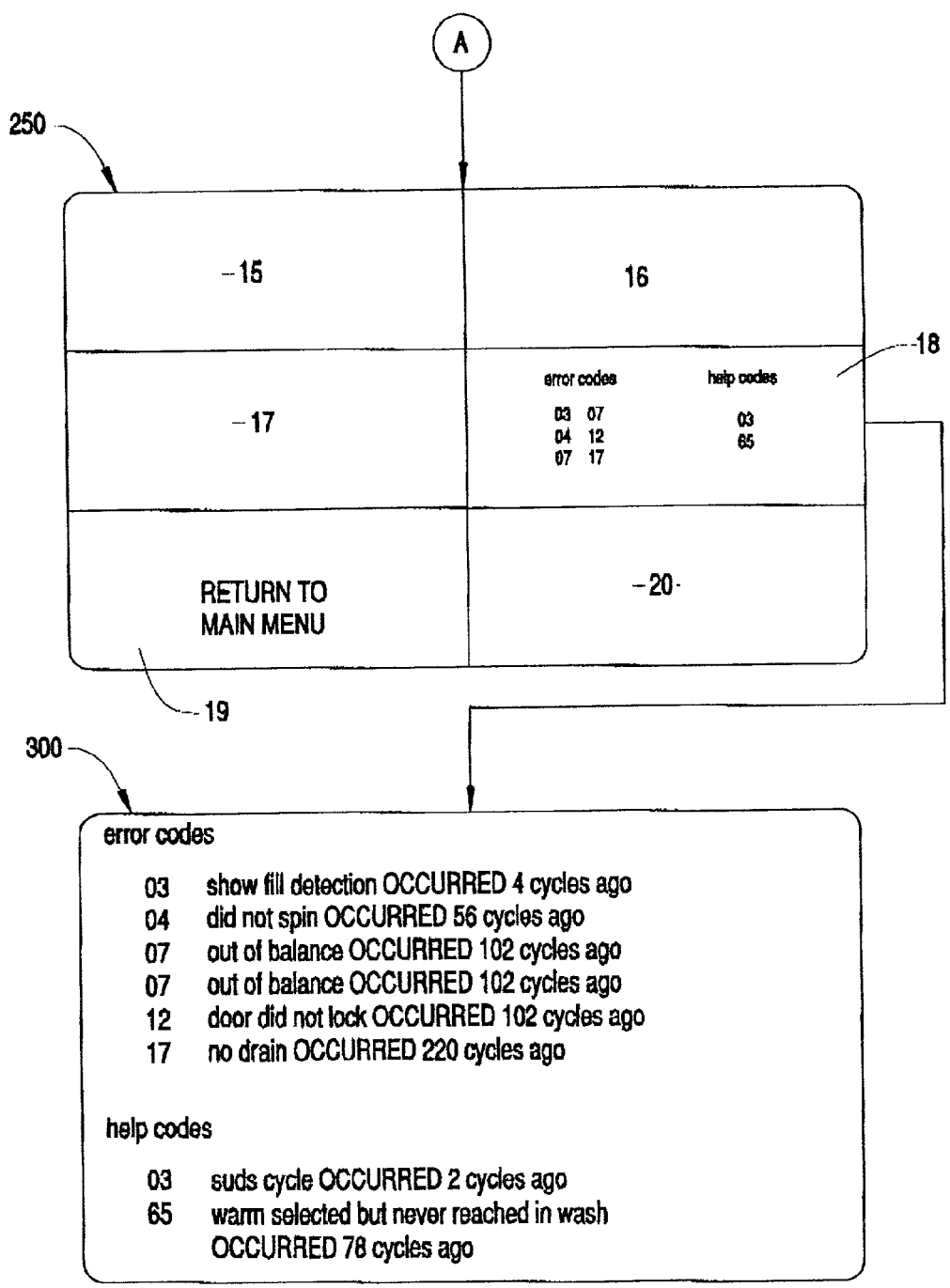

INFORMATION DISPLAY SYSTEM FOR AN APPLIANCE INCORPORATING ELECTRONIC INTERFACE SCREEN

BACKGROUND OF THE INVENTION

1. Field of the Invention

The present invention pertains to the art of appliances and, more particularly, to a system for displaying information through an electronic interface system of an appliance.

2. Discussion of the Prior Art

Automatic commercial washing machines have traditionally been operated from stored programs based on the positioning of various manually actuated buttons. Currently, most washing machines incorporate electronic control systems used to establish wash temperatures and time settings for the various operations performed by the washing machine. It is also known to employ a menu driven display, such as an LCD touch screen, in a washing machine or other appliance through which desired cycle information can be inputted.

One major advantage of utilizing a menu driven display over more conventional, manually actuated buttons, is that the display can be used to advantageously prompt a user for programming inputs, as basic as the type of fabric to be cleaned to the degree or level of soiling, or as complex as the desired water extraction speed and temperature. In addition to prompting the user for necessary programming information, the washing appliance can visually display a wide range of information to the user, including washing instructions and tips, as well as help information for operating and programming the washing machine. Furthermore, there is at least the potential to display diagnostic information which can be beneficial for service personnel or the like.

Given the available mounting area, a visual display on an appliance will typically need to be fairly small. For displaying basic programming information, this size is not considered problematic. However, if the system is to display other types of information, such as washing instructions and diagnostic records, there can be a considerable amount of data which needs to be presented in order to adequately convey the desired information. Under such circumstances, the available display area may simply not be adequate enough to make that information available, at least without scrolling through the information. This problem is further amplified by the fact that known displays typically designate certain areas for particular kinds of information. Under such circumstances, the entire field of the display is simply not available for relaying the wealth of information which needs to be conveyed.

Based on the above, there exists a need for a menu display system in an appliance which overcomes the problems of the prior art. More particularly, there exists a need for an interactive appliance display which can present a wide range of information in a limited amount of space, while enhancing the manner and amount of information that can be accessed.

SUMMARY OF THE INVENTION

The present invention is directed to a display system for an appliance incorporating an electronic interface screen, wherein the display screen can be used to present a wide range of information concerning operational, diagnostic and other data concerning the appliance. In accordance with a preferred embodiment of the invention, the appliance is provided with an LCD screen which is driven through a menu control arrangement for enabling programming parameters to be entered by a user, as well as accessing additional diagnostic and other data. The screen is preferably divided into a number of panels, with each panel being adapted to display a different set of information. Selecting one of the panels results in the selected panel becoming enlarged so as to fill the entire LCD screen while, at the same time, results in additional, detailed information to be displayed.

In accordance with the invention, individual display screens may be selected via a separate button or directly touching the screen itself. As a result, selecting an individual panel portion of the screen results in the information in the panel enlarging to a full screen view. The data is preferably maintained in a hierarchical format such that enlarging the panel causes an additional layer of information to be displayed. Therefore, in addition to the information provided in the originally selected screen panel, the information is automatically expanded to provide additional data related to the selected field. In this manner, each screen can provide the user with a wide range of selection options, while still enabling a significant amount of information to be conveyed to the user on any particularly selected topic.

Additional objects, features and advantages of the present invention will become more readily apparent from the following detailed description of a preferred embodiment when taken in conjunction with the drawings wherein like reference numerals refer to corresponding parts in the several views.

BRIEF DESCRIPTION OF THE DRAWINGS

FIG. 2B is a diagrammatic representation of additional operating screens in the overall sequence of FIG. 2A.

DETAILED DESCRIPTION OF THE PREFERRED EMBODIMENT

Figure 1:
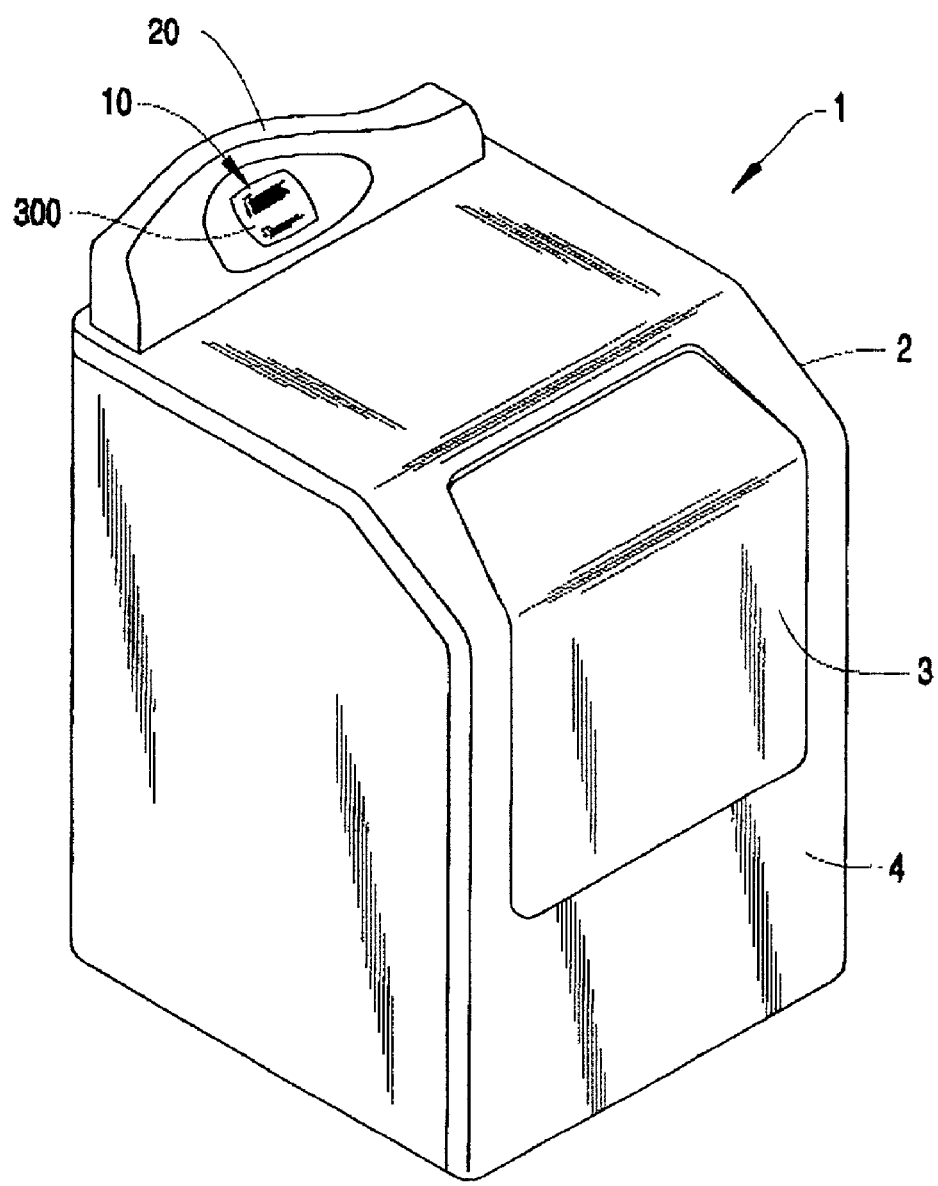
FIG. 1 is a perspective view of a washing machine having an electronic interface screen and incorporating the information display system of the present invention.

With initial reference to FIG. 1, an appliance 1 is schematically shown in the form of a washing machine. Appliance 1 includes a cabinet 2 provided with a door 3 in a front face 4. Door 3 is designed to be pivoted to expose an integral washing tub (not shown). A display 10 is provided in a control panel 20 through which a user controls and programs washing appliance 1. As will become more fully evident below, the particular construction of washing appliance 1 can significantly vary in accordance with the present invention. Display 10 includes a plurality of touch control zones in which are provided keywords (see FIG. 2A) that can be selected by a user in connection with both programming and operating washing machine 1. Actually, as shown in FIG. 2B, display 10 preferably includes six zones 15-20 as will be discussed more fully below.

In the most preferred form of the invention, display 10 takes the form of an LCD display, such as a 128×96 dot matrix, touch screen display, which enables a user to readily review displayed data, preferably in alpha or word text format, and select from that data to establish and begin a desired washing operation, as well as retrieve a wide range of information regarding appliance 1. Display 10, although shown with the various selectable zones 15-20 near or close to the corner and side portions of display 10, could have the selectable zones 15-20 at any location on the display. However, in accordance with the most preferred embodiment of the invention, zones 15-20 are preferably equal in area.

The manner in which washing appliance 1 operates in accordance with the most preferred embodiment will now be described with reference to the diagrams of FIGS. 2A and 2B. However, at this point, it should be realized that, in addition to the control options presented in these figures, appliance 1 may also include various buttons, such as a "POWER" button used to selectively turn on or off washing appliance 1, and a "BACK/CLEAR" button used to erase an inadvertently inputted control parameter through display 10. In any event, FIGS. 2A and 2B illustrate a preferred programming sequence used to illustrate the manner in which information is advantageously presented in accordance with the invention. Specifically, upon activating washing machine 1, a user is presented with screen 100. As shown, screen 100 preferably presents various operating options for washing appliance 1. With screen 100 displayed, the user can select a desired operating command, preferably by simply touching a portion of display 10 in which a key word is indicated. As shown, the user can select "Hints & Tips", "Select Cycle", "Help", or "Quit" options. Details on the operation of washing appliance 1 upon selecting the "Help" option will be presented more fully below. Further operational details are disclosed in pending U.S. patent application Ser. No. 09/741,067 entitled "Interactive Control System for a Laundry Appliance", filed Dec. 21, 2000, which is hereby incorporated by reference.

Figure 2A:
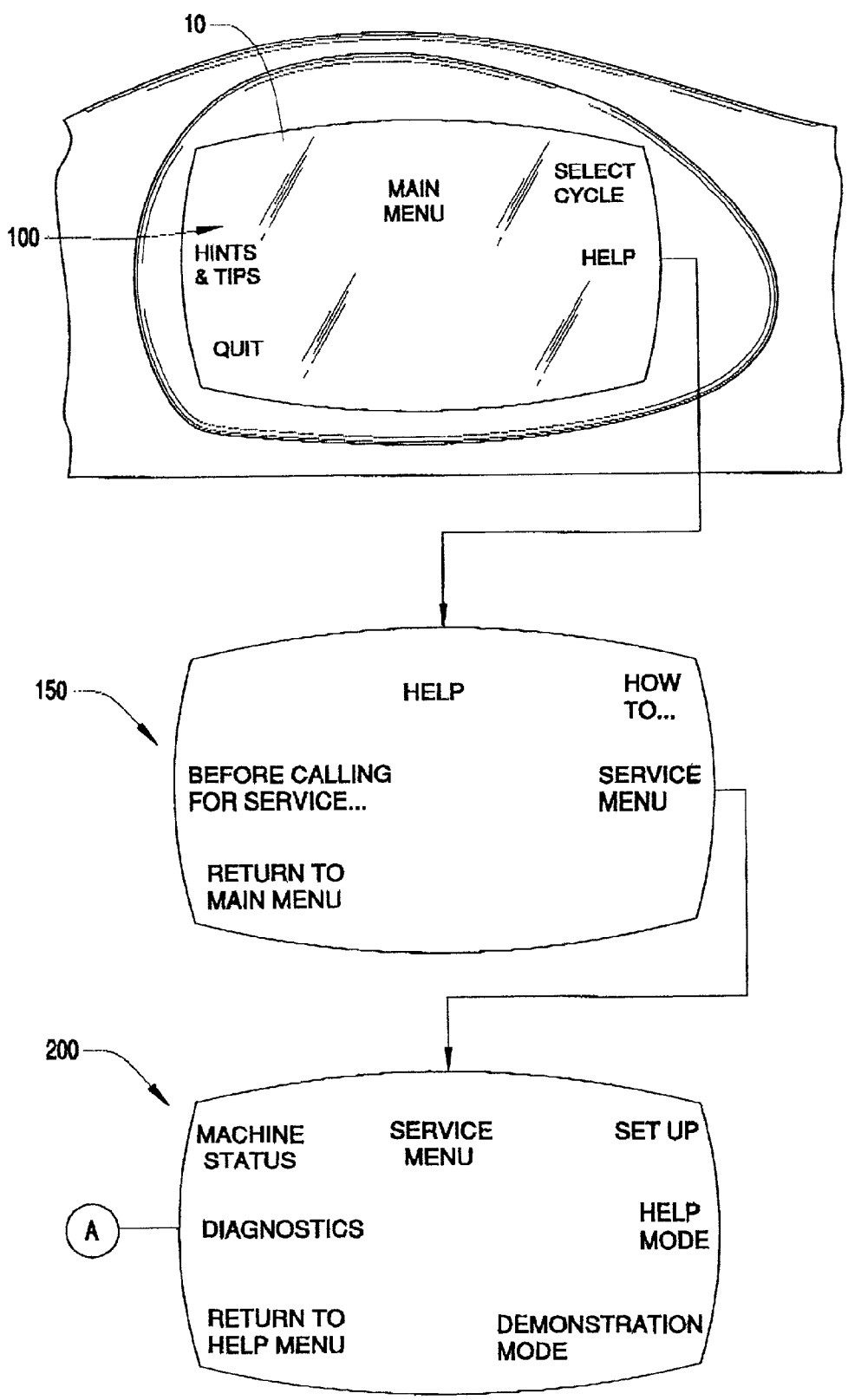
FIG. 2A is a diagrammatic representation of a portion of an operating screen sequence employed in accordance with a preferred embodiment of the invention.

As indicated above, washing appliance 1 is provided with a help sequence, shown in detail in FIGS. 2A and 2B, which is activated by selecting the "Help" option from screen 100. The help sequence is initially displayed to the user in screen 150. Selecting a "How to . . . " option from screen 150 causes washing appliance 1 to present the user with a variety of general washing procedures and suggestions for each. Screen 150 also provides the user with a "Before Calling for Service . . . " option which can be used to present a series of commands to the user to perform before calling a service technician. These commands are designed to alleviate the necessity of calling the service technician prior to considering basic potential problem areas, such as checking the various supply and waste hoses.

A "Service Menu" option is also provided from screen 150. Selecting this option changes display 10 to give the user a variety of additional options for servicing washing appliance 1 as shown by screen 200. A "Demonstration Mode" option is available, through which the tumble action, or other washing operations, are exhibited. Additionally, a "Help Mode" option is provided which preferably presents "Help Codes", "Extended Fill Option", "Software Revision", "Spinner RPM", as well as other types of service help information.

Selecting a "Machine Status" option shows the current condition of washing appliance 1 such as the number of cycle counts. Selecting a "Set Up" option from the service menu screen 200 gives the user the ability to set up the washing operation of washing appliance 1. For instance, although not directly related to the present invention, a "Cycle Set Up" option, a "Counter Set Up" option, and a "Language Set Up" option are preferably provided as options given in the setup mode. The "Cycle Set Up" option is used to redefine one or more steps of an individual cycle, such as demonstrated in co-assigned U.S. patent application Ser. No. 09/740,977 entitled "Programmable Laundry Appliance", filed on Dec. 21, 2000, and incorporated herein by reference. The "Counter Set Up" option is used to display and reset a running counter which calculates the number of times each cycle has been actuated and, optionally, the number of times each of the menu systems has been accessed, as well as error code counts. The "Language Set Up" option can be used to change the language which is displayed by washing appliance 1. Again, these details of the operation of washing machine 1 are disclosed in the above-referenced and incorporated pending U.S. patent applications. Therefore, this portion of the description has basically been provided for the sake of completeness.

The present invention will now be more fully detailed with reference to the screens associated with the selection of a diagnostics mode of washing appliance 1, which is accessed via a "Diagnostics" option from screen 200. Although not shown, an initial screen of the diagnostics mode preferably presents the user with a "Field Test Cycle" option which runs washing appliance 1 through a specially designed diagnostic cycle to test the operation of washing appliance 1. A similar "Factory Test Cycle" option is provided, which runs washing appliance 1 through a different specially designed diagnostic cycle to test the operation of washing appliance 1.

More importantly, in connection with explaining the present invention, screen 250 shows error and help codes accessible through the "Diagnostics" selection. As clearly shown in this figure, error and help codes are confined to display zone 18. Although not shown, additional selectable data would actually be displayed in one or more of zones 15-17 and 20. In any event, the available area in which the error and help codes can be displayed is limited. As shown, zone 18 is actually only large enough to display coded information for the error and help data. This information is preferably collected and stored in connection with aiding a technician or other service personnel in diagnosing any operational problems associated with washing machine 1. If limited to this type of format, the technician or service personnel would have to rely upon personal knowledge, supplemental manuals or the like in order to actually determine the information being conveyed. If the data was enlarged on screen 250 to occupy additional zones 15-17 and 20, this would just limit the permissible amount of other information which could be shown without having to add one or more additional screens. Requiring the user to go through screens which contain absolutely no sought information is considered to be particularly undesirable in accordance with the invention.

To address this concern, the present invention specifically provides for enlarging zone 18 to encompass the entire display 10 as represented in screen 300. At the same time, an additional layer of information is added to the display. In the embodiment shown, this additional information takes the form of expanded definitions for the error and help codes. Therefore, in accordance with the most preferred form of the invention, the data or information is maintained in a hierarchical arrangement whereby expanding one of the LCD panels, e.g., the panel represented by zone 18, enables an additional layer of information to be displayed. In accordance with the invention, if details of the error and/or help codes are not needed, zone 18 will simply not be touched or otherwise selected for expansion. In this case, screen 300 is not conveyed to the user. On the other hand, if details of the error and/or help codes are needed, all of the area covered by display zones 15-20 are used to convey a full wealth of information in an efficient and effective manner. Screen 300 can be reverted back to previous screen 250 by simply touching screen 300 or, if a "BACK/CLEAR" button is provided as discussed above, by depressing the button.

Although described with reference to a preferred embodiment of the invention, it should be readily understood that various changes and/or modifications can be made to the invention without departing from the spirit thereof. For instance, although the information display system has been disclosed with particular reference to displaying information concerning error and help codes for diagnostic purposes, it should be readily apparent that a wide range of information can be displayed in a compressed form and then expanded as needed in accordance with the present invention. In addition, although described as being incorporated within a washing machine, it should be readily apparent that the information display system of the invention could be equally employed in other types of appliances, including, but not limited to, clothes dryers, dishwashers and refrigerators. In general, the invention is only intended to be limited by the scope of the following claims.

We claim:

1. A method of conveying information on a display screen of an appliance which is selected from the group consisting of a washing machine, a clothes dryer, a dishwasher and a refrigerator and includes a door movable to expose an inner portion of the appliance, the method comprising:
   dividing the screen into a plurality of selectable zones;
   displaying a first set of information in one of the plurality of selectable zones; and
   causing said one of the plurality of selectable zones to become enlarged, while automatically presenting a second set of information with the first set of information, the second set of information representing additional details concerning the first set of information on the screen, wherein said one of the plurality of selectable zones, including both the first and second sets of information, substantially, entirely encompasses the screen.

2. The method according to claim 1, further comprising:
   presenting the first set of information in a form of codes concerning operation of the appliance.

3. The method according to claim 2, wherein the codes are diagnostic codes and the second set of information constitutes definitions of said diagnostic codes.

4. The method according to claim 3, wherein diagnostic codes are presented as the first set of information.

5. The method according to claim 1, wherein the plurality of selectable zones are divided into substantially equally sized areas.

6. The method according to claim 1, further comprising: maintaining the first and second sets of information in a hierarchical format.

7. The method according to claim 1, further comprising:
   physically touching the screen to enlarge said one of the plurality of selectable zones.

8. In an appliance which is selected from the group consisting of a washing machine, a clothes dryer, a dishwasher and a refrigerator and includes a door movable to expose an inner portion of the appliance, as well as a display screen for conveying operational and control information, a method of conveying the information to a person through the display screen comprising:
   displaying a first set of information in a compressed form in one of a plurality of selectable zones of the screen; and
   enlarging said one of the plurality of selectable zones, while automatically presenting a second set of information with the first set of information when the person cannot determine the information being conveyed through the first set of information such that additional details of the first set of information is needed, the second set of information representing additional details concerning the first set of information on the screen, wherein said one of the plurality of selectable zones, including both the first and second sets of information, substantially, entirely encompasses the screen.

9. The method according to claim 8, further comprising:
   presenting the first set of information in a form of codes concerning operation of the appliance.

10. The method according to claim 9, further comprising: providing the additional details to define the codes.

11. The method according to claim 10, wherein diagnostic codes are presented as the first set of information and the second set of information constitutes definitions of said diagnostic codes.

12. The method according to claim 8, wherein the plurality of selectable zones are divided into substantially equally sized areas.

13. The method according to claim 8, further comprising: maintaining the first and second sets of information in a hierarchical format.

14. The method according to claim 8, further comprising:
   physically touching the screen to enlarge said one of the plurality of selectable zones.

15. An appliance selected from the group consisting of a washing machine, a clothes dryer, a dishwasher and a refrigerator comprising:
   a door movable to expose an inner portion of the appliance;
   a control panel;
   a display device provided on the control panel and including a screen divided into a plurality of selectable display zones;
   means for displaying a first set of information in one of the plurality of selectable display zones; and
   means for enlarging said one of the plurality of selectable display zones to substantially, entirely encompass the screen while automatically presenting a second set of information with the first set of information, the second set of information representing additional details concerning the first set of information on the screen.

16. The appliance according to claim 15, wherein the first set of information constitutes codes concerning operation of the appliance.

17. The appliance according to claim 16, wherein the second set of information defines the codes.

18. The appliance according to claim 15, wherein the plurality of selectable display zones are substantially, equally sized.

19. The appliance according to claim 15, wherein the screen constitutes a touch screen.

20. The appliance according to claim 15, wherein the appliance constitutes a laundry appliance.

* * * * *